DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 28, 1972

896 O.G. 1208

T896,051

PROCESS FOR FORMING COLLODIAL POLYMERIC DISPERSIONS FOR MAKING MICROPOROUS MATERIALS

Arthur H. Hamlin, Kennett Square, Pa., Henn Kilkson, Wilmington, Del., and Harry P. Wood, Wilton, Conn., assignors to E. I. du Pont de Nemours and Company, Wilmington, Del.

Continuation-in-part of application Ser. No. 667,411, Sept. 13, 1967. This application Nov. 12, 1970, Ser. No. 89,136

Int. Cl. C08g *22/04, 53/18*

U.S. Cl. 260—29.2 TN

1 Sheet Drawing. 21 Pages Specification

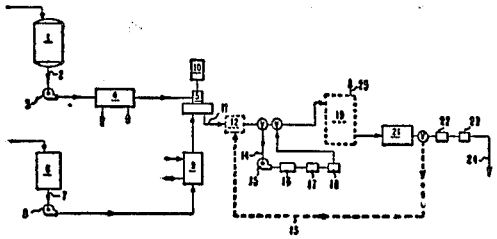

A process for forming a colloidal polymeric dispersion used in making microporous sheet material having a secant tensile modulus at 5% elongation of about 600 p.s.i. by microblending a solution of a polymeric component and a solution of a solvent and a non-solvent for the polymeric component. The microblending being achieved in about 0.5–5 seconds in a high shear mixing zone having a shear rate of 1,000–150,000 reciprocal seconds and of a stream of a solution of a polymeric component, and particularly a linear polyurethane or a blend of a linear polyurethane and poly (vinyl chloride), at about 15–60° C. and of a stream of an organic solvent and non-solvent, particularly water, at about 20–50° C. The quantity of organic solvent being about 95–25% and the quantity of non-solvent being about 5–75%. The temperature of the blend being thereafter reduced about 2–50° C. to form a colloidal polymeric dispersion having a non-solvent content of about 3–5% by weight.

March 28, 1972 A. H. HAMLIN ET AL T896,051
PROCESS FOR FORMING COLLOIDAL POLYMERIC DISPERSIONS
FOR MAKING MICROPOROUS MATERIALS
Filed Nov. 12, 1970
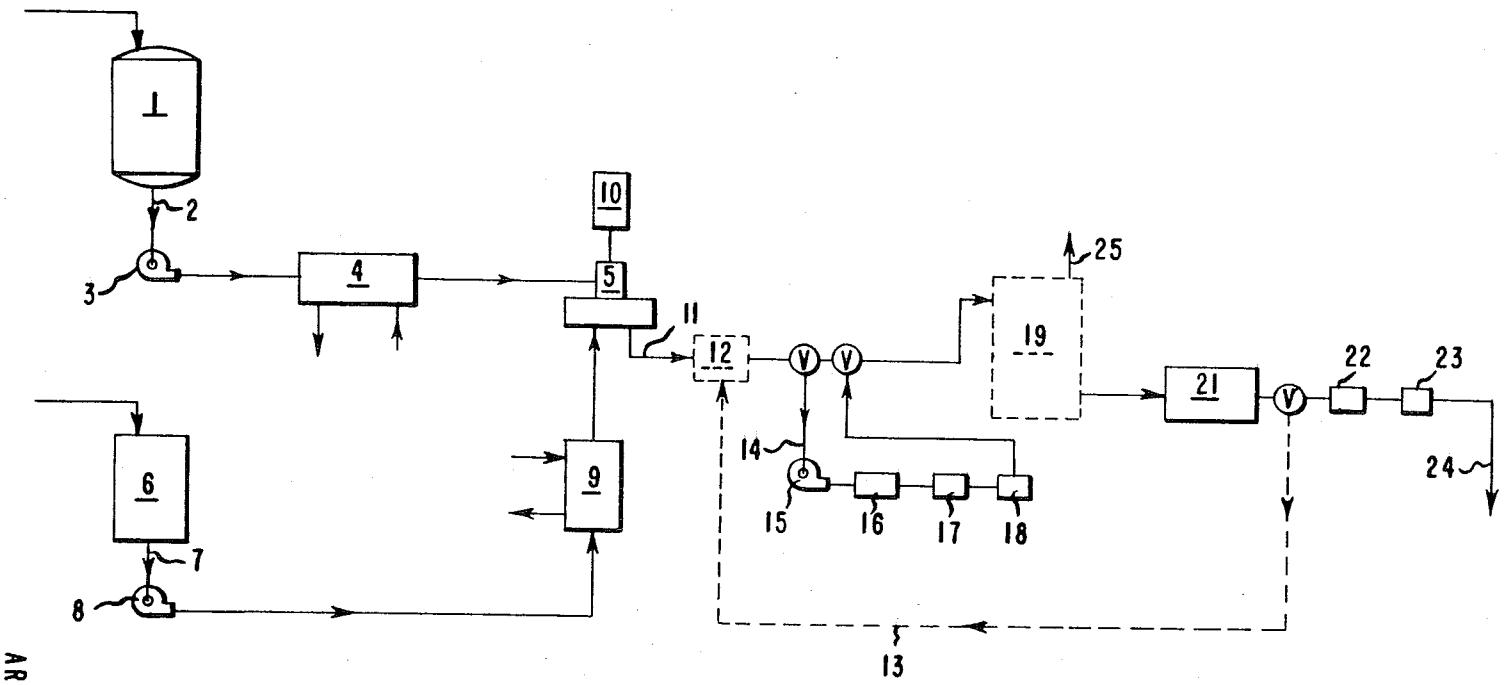
INVENTORS
ARTHUR H. HAMLIN
HENN KILKSON
HARRY P. WOOD
BY Hilmar L. Fricke
ATTORNEY